(12) United States Patent
Yun et al.

(10) Patent No.: US 8,500,882 B2
(45) Date of Patent: Aug. 6, 2013

(54) AIR PURIFIER HAVING DEHUMIDIFICATION FUNCTION

(75) Inventors: Seong-Jin Yun, Seoul (KR); Byung-Kil Park, Seoul (KR)

(73) Assignee: Woongjin Coway Co., Ltd. (KR)

( * ) Notice: Subject to any disclaimer, the term of this patent is extended or adjusted under 35 U.S.C. 154(b) by 140 days.

(21) Appl. No.: 13/125,513

(22) PCT Filed: Oct. 22, 2009

(86) PCT No.: PCT/KR2009/006137
§ 371 (c)(1),
(2), (4) Date: Apr. 21, 2011

(87) PCT Pub. No.: WO2010/047550
PCT Pub. Date: Apr. 29, 2010

(65) Prior Publication Data
US 2011/0197770 A1 Aug. 18, 2011

(30) Foreign Application Priority Data

Oct. 22, 2008 (KR) .......................... 10-2008-0103797
Sep. 30, 2009 (KR) .......................... 10-2009-0093480

(51) Int. Cl.
*B01D 53/02* (2006.01)
(52) U.S. Cl.
USPC ............... 96/134; 96/143; 96/144; 96/146; 96/150; 62/94; 62/271; 165/7; 165/8
(58) Field of Classification Search
USPC ..... 96/143, 144, 146, 150; 62/94, 271; 165/7, 165/8
See application file for complete search history.

(56) References Cited

U.S. PATENT DOCUMENTS

| | | | |
|---|---|---|---|
| 6,182,453 B1 * | 2/2001 | Forsberg | 62/125 |
| 6,889,750 B2 * | 5/2005 | Lagace et al. | 165/8 |
| 7,231,967 B2 * | 6/2007 | Haglid | 165/231 |
| 7,458,228 B2 * | 12/2008 | Lagace et al. | 62/271 |

(Continued)

FOREIGN PATENT DOCUMENTS

JP 11-211147 A 8/1999
JP 2000-167333 A 6/2000

(Continued)

OTHER PUBLICATIONS

PCT Search Report and Written Opinion for PCT/KR2009/006137, dated Jun. 17, 2010.

*Primary Examiner* — Christopher P Jones
(74) *Attorney, Agent, or Firm* — Dority & Manning, P.A.

(57) ABSTRACT

There is provided an air purifier having a dehumidification function, including: a body case having an inner space; a blower part installed in the inner space of the body case and drawing outside air from both sides of the body case through a single blower fan; an air purifying part purifying air drawn from one side of the body case; and a dehumidifying part removing moisture from air drawn from the other side of the body case by a dehumidifying rotor. Through the blower part drawing the air from both sides of the body case, the air purifier purifies the air drawn from one side of the body case and dehumidifies the air drawn from the other side of the body case. Accordingly, a drop in an airflow amount caused by concurrently performing the dehumidification and the purification may be alleviated, so improved dehumidification and purification effects are achieved.

13 Claims, 5 Drawing Sheets

U.S. PATENT DOCUMENTS

| | | | |
|---|---|---|---|
| 7,856,840 B2 * | 12/2010 | Yoon et al. | 62/285 |
| 2005/0132681 A1 | 6/2005 | Chu | |
| 2006/0278084 A1 * | 12/2006 | Kim | 96/140 |
| 2006/0278085 A1 * | 12/2006 | Kim et al. | 96/140 |
| 2006/0283327 A1 * | 12/2006 | Yoon et al. | 96/143 |
| 2007/0040290 A1 * | 2/2007 | Lin | 261/154 |
| 2007/0062370 A1 * | 3/2007 | Ahn et al. | 95/115 |
| 2008/0085437 A1 * | 4/2008 | Dean et al. | 429/26 |

FOREIGN PATENT DOCUMENTS

| | | |
|---|---|---|
| JP | 2004-101125 A | 4/2004 |
| JP | 2005-177739 A | 7/2005 |
| JP | 2005-185930 A | 7/2005 |
| KR | 10-2006-0095057 A | 8/2006 |
| KR | 10-2006-0129671 A | 12/2006 |
| KR | 10-2006-0131112 A | 12/2006 |
| WO | 2006-135168 A | 12/2006 |

* cited by examiner

AIR PURIFIER HAVING DEHUMIDIFICATION FUNCTION

TECHNICAL FIELD

The present invention relates to an air purifier, and more particularly, to an air purifier having a dehumidification function removing moisture from inflow air and/or allowing for air purification.

BACKGROUND ART

In general, an air purifier absorbs polluted indoor air, filters dust and odor particles contained in the air, and purifies the absorbed air to create clean air. The purified air is discharged to the outside of the air purifier, i.e., indoors.

In other words, the air purifier absorbs polluted surrounding air, purifies the absorbed air, and discharges clean air to the outside, thereby purifying the air surrounding an area where the air purifier is installed.

In order to perform such operations, the air purifier may commonly include an air blower allowing for the inflow of surrounding air and the discharge of purified air, and a filter allowing for the filtering of dust and odor particles contained in the inflow air.

Although the air purifier is able to absorb surrounding air, purify the inflow air, and discharge the purified air, it is unable to remove moisture contained in the inflow air. Accordingly, if the air purifier runs in an atmosphere having high humidity such as that of summer, the moisture contained in the air may be transmitted into a deodorizing filter and attached thereto.

Eventually, the accumulated moisture attached to the deodorizing filter may degrade the performance of the deodorizing filter. For example, if the moisture is attached to the surface of the deodorizing filter, it may be tangled with pollutants in the air. This may result in the increased pollution level of each filter or in reduced blowing efficiency caused by the blockage of the pores of each filter, thereby causing a reduction in a filter replacement period and in the lifetime of the filter.

In order to solve this problem, an air purifier currently has a dehumidifying part installed therein and air purifying filters installed behind the dehumidifying part in terms of an air flow path, thereby allowing for dehumidification and air purification at the same time.

However, this air purifier requires the inflow air to pass through the dehumidifying part and the air purifying filters, so the constant pressure required for the inflow air is large, whereby dehumidifying and purifying performances are degraded.

That is, when the inflow air having a single airflow is subject to dehumidification and air purification at the same time, discharged airflow amount is reduced.

DISCLOSURE OF INVENTION

Technical Problem

An aspect of the present invention provides an air purifier having a dehumidification function, which allows for the removal of moisture from inflow air and the purification of inflow air, and concurrently alleviates a drop in an airflow amount caused by performing the dehumidification and the purification at the same time.

An aspect of the present invention also provides an air purifier having a dehumidification function, which removes moisture from inflow air and/or purifies inflow air according to a user s preference.

An aspect of the present invention also provides an air purifier having a dehumidification function, which capable of preventing a blower fan drawing the outside air from being stopped.

Solution to Problem

According to an aspect of the present invention, there is provided an air purifier, the air purifier including: a body case having an inner space; a blower part installed in the inner space of the body case and drawing outside air from both sides of the body case through a single blower fan; an air purifying part purifying air drawn from one side of the body case; and a dehumidifying part removing moisture from air drawn from the other side of the body case by a dehumidifying rotor.

The body case may include the first partition unit for separating the dehumidifying part from the blower part, wherein including a first through-hole in order to draw the air drawn from the other side of the body case into the blower part.

The first partition unit may include a first opening and closing member opening and closing the first through-hole in order to adjust a flow amount of the air drawn into the blower part through the first through-hole.

The blower part may include a heat detecting member detecting heat generated from a driving source, the driving source being connected to the blower fan and allowing the blower fan to be driven. When the heat detected by the heat detecting member is greater than a preset value, the first through-hole may be blocked by the first opening and closing member or the humidifying part may cease operations.

The blower fan may have an opening on one surface thereof and at least one entry hole on the other surface thereof in order to draw the air in both directions.

The body case may further include the second partition unit for separating the air purifying part from the blower part, wherein including a second through-hole in order to draw the air drawn from one side of the body case into the blower part.

The second partition unit may include a second opening and closing member opening and closing the second through-hole in order to adjust a flow amount of the air drawn into the blower part through the second through-hole.

The first through-hole may be smaller than the second through-hole in order that the constant pressure required when air is drawn from one side of the body case is equal to or similar to that required when air is drawn from the other side of the body case.

The body case may further include a first inlet allowing air to be drawn through one side of the body case and a second inlet allowing air to be drawn through the other side of the body case opposite to the first inlet.

The air purifier may further include a controlling part connected to the first and second opening and closing members, first and second rotating members, and the heat detecting member, and adjusting an amount of the air drawn into the blower part.

The body case may further include the first and second rotating members respectively installed in the first and second inlets and allowing the outside air to be drawn through the first and second inlets or to be blocked.

The dehumidifying part may include a dehumidifying rotor unit having the dehumidifying rotor installed to be rotated and removing the moisture from the air drawn from the other side of the body case, a condenser connected to the dehumidifying rotor unit and condensing the moisture removed from the dehumidifying rotor unit, and a condensed water storage tank connected to the condenser and storing condensed water.

The dehumidifying rotor unit may include a partition installed in the body case and dividing a space where the dehumidifying part is disposed, the dehumidifying rotor installed in the partition to be rotated and removing the moisture from the air drawn from the other side of the body case, an air circulation component creating a separate airflow circulating within the dehumidifying part in order to remove moisture from the dehumidifying rotor absorbing the moisture from the air drawn from the other side of the body case, and a heating component disposed between the dehumidifying rotor and the air circulation component in order to heat the air sent by the air circulation component.

The condenser may include an inlet hole allowing the air circulated by the air circulation component to be drawn therethrough, an outlet hole allowing the air drawn from the inlet hole in a dehumidified state to be outputted therethrough, and a flow tube allowing the air circulated by the air circulation component to flow therethrough in order to perform heat transfer with air penetrating through a ventilating opening, the ventilating opening being formed to allow the air drawn from the other side of the body case to penetrate therethrough.

The condenser may further include a discharge hole allowing condensed water condensed from the air circulated by the air circulation component to be discharged therethrough.

Advantageous Effects of Invention

According to exemplary embodiments of the invention, an air purifier is capable of purifying the air drawn from one side of a body case and dehumidifying the air drawn from the other side of the body case by the use of a blower part drawing the air from both sides of the body case, whereby a drop in an airflow amount caused by concurrently performing the dehumidification and the purification may be alleviated. Accordingly, improved dehumidification and purification effects are achieved.

Also, the air inflow into any one of both sides of the body case may be blocked by first and second opening and closing members and first and second rotating members, so the dehumidification function removing moisture from the inflow air and/or the purification function purifying the inflow air may be performed selectively, according to a user s preference.

When heat, generated by a driving source which allows a blower fan to be driven, is detected to be greater than a preset value by a heat detecting member, the amount of dehumidified air drawn into the blower part is controlled to be reduced by the first opening and closing member, thereby preventing the operations of the blower fan drawing the outside air into the inner space of the body case from being stopped.

Moreover, the constant pressure required to draw the outside air through both sides of the body case may be properly distributed by first and second through-holes of a different size.

MODE FOR THE INVENTION

Exemplary embodiments of the present invention will now be described in detail with reference to the accompanying drawings.

Figure 1:
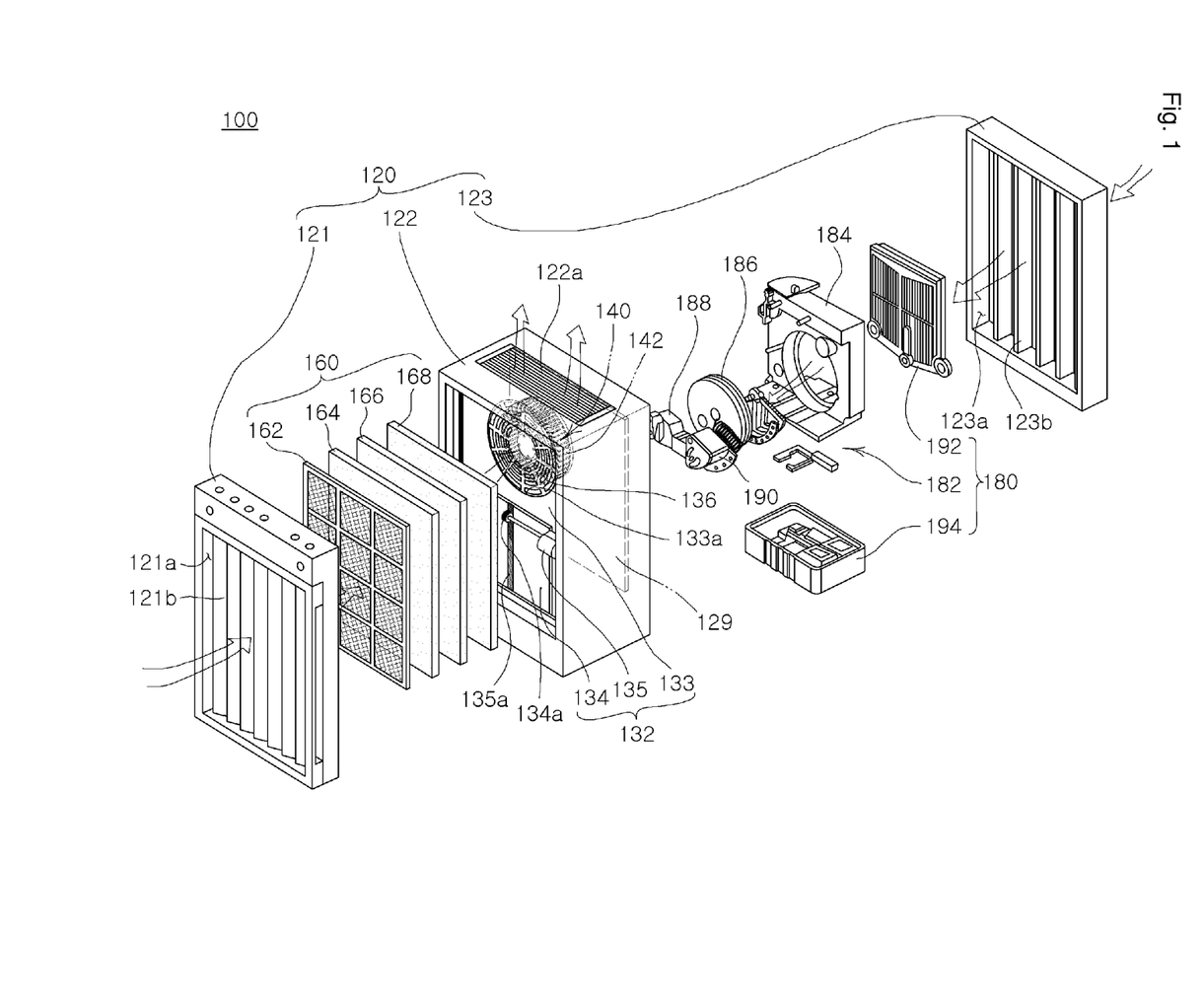
FIG. 1 is an exploded perspective view illustrating an air purifier according to an exemplary embodiment of the present invention.

FIG. 1 is an exploded perspective view illustrating an air purifier according to an exemplary embodiment of the present invention.

Referring to FIG. 1, an air purifier 100 having a dehumidification function (hereinafter, referred to as an air purifier) includes a body case 120, a blower part 140, an air purifying part 160, and a dehumidifying part 180.

The body case 120 has an inner space. The body case 120 may include a front case 121, a main case 122, and a rear case 123. That is, the body case 120 is formed by combining the front, main, and rear cases 121, 122, and 123.

However, the body case 120 is not limited thereto. The body case may be a single integrated unit without the division of the front, main, and rear cases 121, 122, and 123.

The front case 121 may have a first inlet 121a allowing for the inflow of air. Through the first inlet 121a, outside air may be drawn into the body case 120.

The main case 122 may have an inner space. Also, the main case 122 may have a discharge outlet 122a on the top surface thereof. Through the discharge outlet 122a, the air drawn into the body case 120 may be discharged to the outside.

The rear case 123 may include a second inlet 123a allowing for the inflow of air. Through the second inlet 123a, the outside air may be drawn into the body case 120.

That is, the body case 120 may include the first and second inlets 121a and 123a in order to allow the air to be drawn from both sides of the body case 120. The dehumidified and/or purified air is discharged to the outside of the body case 120 through the discharge outlet 122a.

According to this embodiment, the first and second inlets 121a and 123a are disposed on the front and rear surfaces of the body case 120, respectively, and the discharge outlet 122a is disposed on the top surface of the body case 120. However, the invention is not limited thereto. The first and second inlets 121a and 123a, and the discharge outlet 122a may be disposed on the side, top, or bottom surface of the body case 120 according to variable combinations.

Figure 2:
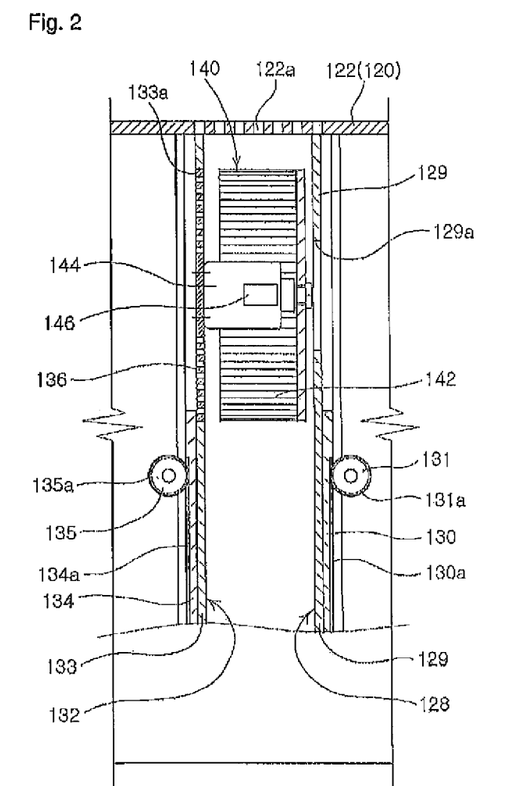
FIG. 2 is a partial cross-sectional view illustrating an air purifier according to an exemplary embodiment of the present invention.

Also, the body case 120 may separate the blower part 140 from the dehumidifying part 180. As shown in FIG. 2, the body case 120 may include a first partition unit 128 having a first through-hole 129a in order to allow the air drawn from the other side of the body case 120 to be drawn into the blower part 140.

That is, the first partition unit 128 may include a first partition member 129 having the first through-hole 129a as shown in FIG. 2, in which the first partition member 129 is included in the body case 120, i.e., the main case 122 in order that the blower part 140 and the dehumidifying part 180 are separated from each other.

Also, the first partition unit 128 may further include a first opening and closing member 130 opening and closing the first through-hole 129*a* in order to adjust the flow amount of the air drawn into the blower part 140 through the first through-hole 129*a*.

The first opening and closing member 130 may ascend and descend by being connected to a first motor 131, in order to open and close the first through-hole 129*a*. Also, the first opening and closing member 130 may include a first rack gear 130*a* combined with the first motor 131, and the first motor 131 may include a first pinion gear 131*a* corresponding to the first rack gear 130*a*.

Accordingly, the first opening and closing member 130 is ascended and descended by the first motor 131, thereby opening and closing the first through-hole 129*a*.

Also, the first motor 131 may be connected to a controlling part (not shown). The controlling part controls the first opening and closing member 130 to open and close the first through-hole 129*a*.

Figure 3:
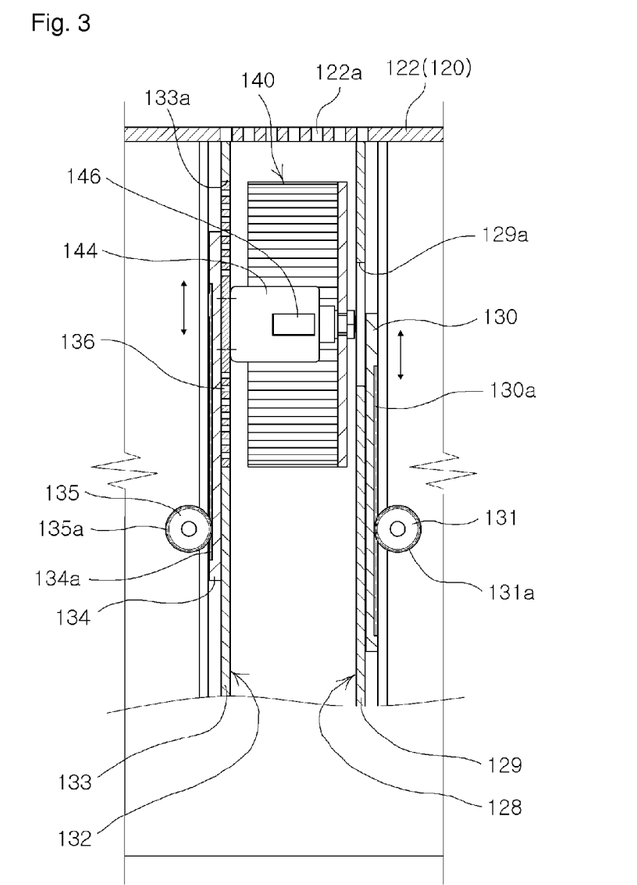
FIG. 3 illustrates the operations of first and second partition units according to an exemplary embodiment of the present invention.

That is, as shown in FIG. 3, since the first through-hole 129*a* is opened and closed by the first opening and closing member 130, the amount of the air drawn into the blower part 140 may be adjusted.

Meanwhile, the body case 120 may separate the blower part 140 from the air purifying part 160. As shown in FIG. 2, the body case 120 may include a second partition unit 132 having a second through-hole 133*a* in order to allow the air drawn from one side of the body case 120 to be drawn into the blower part 140.

That is, the second partition unit 132 may include a second partition member 133 having the second through-hole 133*a*, in which the second partition member 133 is included in the body case 120 in order that the blower part 140 and the air purifying part 160 are separated from each other.

Also, the second partition unit 132 may further include a second opening and closing member 134 opening and closing the second through-hole 133*a* in order to adjust the flow amount of the air drawn into the blower part 140 through the second through-hole 133*a*.

The second opening and closing member 134 may ascend and descend by being connected to a second motor 135, in order to open and close the second through-hole 133*a*. Also, the second opening and closing member 134 may include a second rack gear 134*a* combined with the second motor 135, and the second motor 135 may include a second pinion gear 135*a* corresponding to the second rack gear 134*a*.

Accordingly, the second opening and closing member 134 is ascended and descended by the second motor 135 as shown in FIG. 3, thereby opening and closing the second through-hole 133*a*.

Also, the second motor 135 may be connected to the controlling part. The controlling part controls the second opening and closing member 134 to open and close the second through-hole 133*a*.

As described above, since the second through-hole 133*a* is opened and closed by the second opening and closing member 134, the amount of the air drawn into the blower part 140 may be adjusted.

Meanwhile, in order to prevent negligent accidents when a user performs maintenance or repairs upon the air purifying part 160, a fan grill 136 may be installed in the second through-hole 133*a*.

Also, the first through-hole 129*a* may be smaller than the second through-hole 133*a* in order that constant pressure required when the air is drawn from one side of the body case 120 may be equal to or similar to that required when the air is drawn from the other side of the body case 120.

That is, the constant pressure required for the drawn air to pass through the air purifying part 160 is generally larger than that required for the drawn air to pass through the dehumidifying part 180. In this case, there is a difference between the amount of the air passing through the air purifying part 160 and that of the air passing through the dehumidifying part 180.

In order to compensate for such an imbalance, the first through-hole 129*a* may be smaller than the second through-hole 133*a*.

Figure 4:
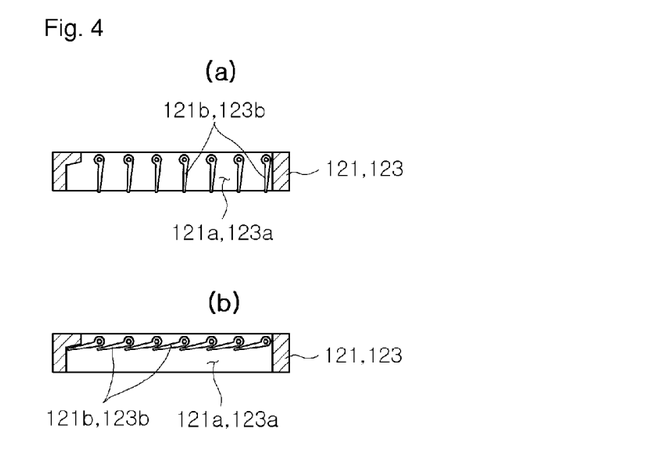
FIG. 4 illustrates the operations of first and second rotating members according to an exemplary embodiment of the present invention.

Meanwhile, as shown in FIG. 4(*a*), the first inlet 121*a* of the front case 121 may include a first rotating member 121*b* in order to open and close the first inlet 121*a* according to a user's necessity.

That is, as shown in FIG. 4(*b*), when the first rotating member 121*b* is rotated in a direction of the flow path of the inflow air, the first rotating member 121*b* allows the first inlet 121*a* to be opened. Also, when the first rotating member 121*b* is rotated to be disposed perpendicular to the flow path of the inflow air, the first rotating member 121*b* allows the first inlet 121*a* to be closed, thereby preventing the air from being drawn into the body case 120 through the first inlet 121*a*.

As shown in FIG. 4(*a*), the second inlet 123*a* of the rear case 123 may include a second rotating member 123*b* in order to open and close the second inlet 123*a*. The second rotating member 123*b* may allow the second inlet 123*a* to be opened and closed in the same manner as the first rotating member 121*b*.

Meanwhile, the first and second rotating members 121*b* and 123*b* may be connected to a driving source (not shown), and the driving source may be connected to the controlling part. In the end, the first and second rotating members 121*b* and 123*b* may be controlled by the controlling part, thereby opening and closing the first and second inlets 121*a* and 123*a*.

That is, the user is able to open and close the first and second inlets 121*a* and 123*a* through the first and second rotating members 121*b* and 123*b*, so the user is able to purify and/or dehumidify the outside air by opening and closing the first and second inlets 121*a* and 123*a* if desired.

In this embodiment, the inclusion of the first and second rotating members 121*b* and 123*b* in the body case 120 is described as an example. However, the amount of the air drawn into the blower part 140 may be adjusted through only the first and second opening and closing members 130 and 134 included in the first and second partition units 128 and 132, without the inclusion of the first and second rotating members 121*b* and 123*b* in the body case 120.

The blower part 140 is installed in the inner space of the body case 120 and draws the outside air from both sides of the body case 120 through a single blower fan 142. That is, the blower part 140 is installed in the inner space of the main case 122 and has the discharge outlet 122*a* disposed on the top surface thereof.

As shown in FIG. 2, the blower part 140 is separated from the air purifying part 160 and the dehumidifying part 180 by the first and second partition members 129 and 133 included in the first and second partition units 128 and 132. Also, the blower part 140 is respectively connected to the dehumidifying part 180 and the air purifying part 160 through the first and second through-holes 129*a* and 133*a* formed in the first and second partition members 129 and 133.

That is, the air drawn from both sides of the body case 120 by the blower part 140 is drawn into the blower part 140 after passing through the first and second through-holes 129a and 133a, and is then discharged from the body case 120 through the discharge outlet 122a.

Figure 5:
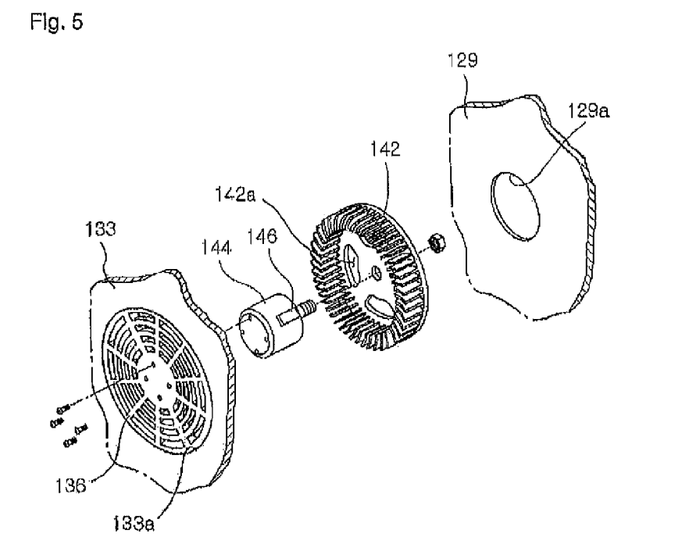
FIG. 5 is an exploded perspective view illustrating a blower part according to an exemplary embodiment of the present invention.

As shown in FIG. 5, the blower fan 142 has an opening on one surface thereof and at least one entry hole 142a on the other surface thereof, in order to draw air inwards in both directions.

That is, the blower fan 142 may have the opening on one surface thereof in order that the air drawn from one side of the body case 120 may pass through the second through-hole 133a and be drawn into a central part of the blower fan 142 in the blower part 140, that is, in an inward direction towards the blower fan 142.

Also, the blower fan 142 may have at least one entry hole 142a on the other surface thereof in order that the air drawn from the other side of the body case 120 may pass through the first through-hole 129a and be drawn into the central part of the blower fan 142 in the blower part 140, that is, in an inward direction towards the blower fan 142.

Accordingly, the blower fan 142 may allow the air to be drawn from the other side of the body case 120 and be discharged to the outside of the body case 120.

Meanwhile, the blower fan 142 may be a dual-sided intake fan widely used in the art. That is, the form of the blower fan 142 may be greatly variable under the condition that it allows the air to be drawn through both sides of the body case 120.

The blower part 140 may include a heat detecting member 146. The heat detecting member 146 is connected to the blower fan 142 and detects heat generated from a driving source 144 which allows the blower fan 142 to be driven.

Meanwhile, the heat detecting member 146 may be connected to the controlling part. When the heat detected by the heat detecting member 146 is greater than a preset value, the controlling part may allow the first through-hole 129a to be closed by the first opening and closing member 130.

That is, the driving source 144 allowing the blower fan 142 to be driven by dehumidified air is generally overheated due to the fact that the rate of enthalpy is increased by the dehumidified air. In this manner, when the driving source 144 is overheated, it may cease operations, i.e., the driving source 144 may be stopped.

In order to prevent such a defect, when the heat detected by the heat detecting member 146 is greater than the preset value, the first through-hole 129a is closed by the first opening and closing member 130.

That is, when the heat detected by the heat detecting member 146 is greater than the preset value, the first through-hole 129a is closed by the first opening and closing member 130 and the dehumidified air passed through the dehumidifying part 180 is blocked so as not to be drawn into the blower part 140, thereby preventing the driving source 144 from being stopped.

Moreover, when the heat detected by the heat detecting member 146 is greater than the preset value, the controlling part may allow the dehumidifying part 180 to be stopped. Accordingly, the overheating of the driving source 144, which may be caused by the inflow of the dehumidified air into the blower part 140, can be prevented.

The air purifying part 160 may be disposed in the flow path of the air drawn through the first inlet 121a in order to purify the air drawn from one side of the body case 120. Also, the air purifying part 160 may include a plurality of filters in order to purify the air.

For example, the air purifying part 160 may include a free filter 162, a medium filter 164, an activated carbon filter 166, and a high efficiency particulate air (HEPA) filter 168.

The free filter 162 may be composed of materials having antibiotic properties. The free filter 162 may remove relatively large dust particles, mold, hair, animal fur, and the like. The medium filter 164 may remove medium-sized dust particles, animal fur, and the like by the use of materials having antibiotic properties.

The free and medium filters 162 and 164 are not limited thereto, and they may be formed by combining a variety of filters. That is, at least one of the free and medium filters 162 and 164 may be a functional filter.

Here, the functional filter may be one of a yellow dust filter removing dust, nitrogen oxides, and sulfur oxides associated with yellow dust particles; a filter for babies and toddlers removing an influenza virus, an avian influenza virus, and the like by the use of contained non-toxic natural materials such as ginkgo extract and sumac extract; a filter for a new house removing formaldehyde and volatile organic compounds (VOCs) known as causal materials in sick house syndrome; and a filter for an old house removing legionella, a bacterium capable of causing serious diseases by being transmitted into lungs through respiratory organs, along with mold and bacteria.

The activated carbon filter 166 may be a deodorizing filter composed of coal or coconut fibre, and absorb and remove cigarette smoke, VOCs, and bad-smelling substances.

The HEPA filter 168 may remove up to 99% of harmful substances contained in indoor air, such as dust mites, viruses and mold, and polluted dust particles having an approximate diameter of 0.3 m.

The HEPA filter 168 has photocatalyst stacked on the surface thereof, with which to decompose harmful substances, such as dust mites, virus and mold, and polluted dust particles of approximately 0.3 m in a photoelectrochemical manner by photoenergy irradiated from a light source (not shown).

The photocatalyst stacked on the surface of the HEPA filter 168 may be titanium oxide ($TiO_2$). That is, $TiO_2$ may be stacked on the surface of the HEPA filter 168.

For the most efficient filtering, the free, medium, activated carbon, and HEPA filters 162, 164, 166, and 168 are sequentially installed in a filter cover (not shown) in order. However, the order of the filters and the filter types are not limited thereto.

The dehumidifying part 180 may be disposed in the flow path of the air drawn through the second inlet 123a in order to remove moisture from the air.

Figure 6:
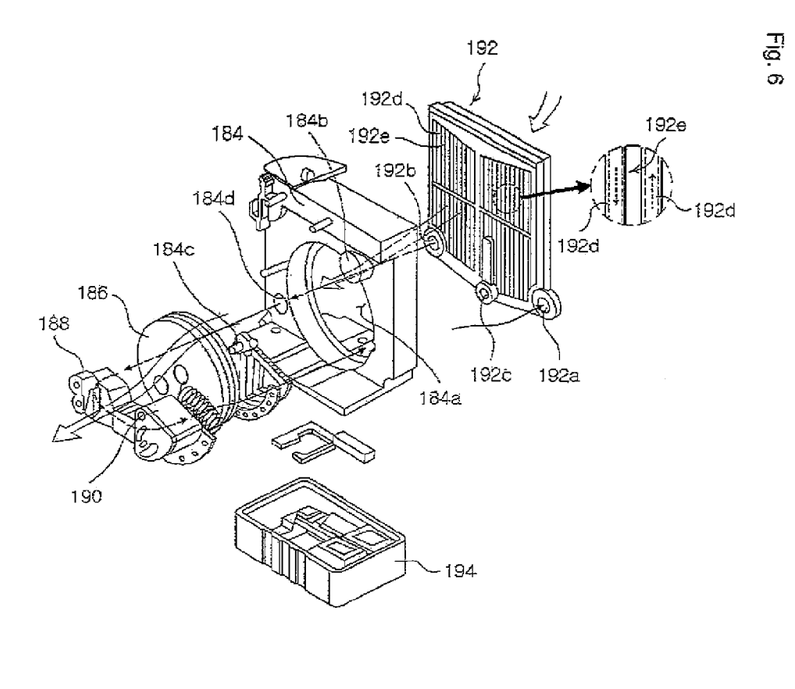
FIG. 6 is an exploded perspective view illustrating a dehumidifying part according to an exemplary embodiment of the present invention.

As shown in FIG. 6, the dehumidifying part 180 may include a dehumidifying rotor unit 182, a condenser 192, and a condensed water storage tank 194. In other words, the dehumidifying part 180 removes moisture from the air drawn through the second inlet 123a by the dehumidifying rotor unit 182, and allows the moisture to be condensed by the condenser 192, and stores the condensed moisture in the condensed water storage tank 194.

Meanwhile, the dehumidifying rotor unit 182 may include a partition 184, a dehumidifying rotor 186, an air circulation component 188, and a heating component 190.

The partition 184 may be installed in the body case 120 in such a manner that an inner space between the second inlet 123a and the first partition unit 128 is divided. Also, the partition 184 may include an opening 184a guiding the flow path of the air drawn through the second inlet 123a to pass through the dehumidifying rotor 186.

Also, the partition 184 may further include a driving motor 184b allowing the dehumidifying rotor 186 to be driven. The driving motor 184b may be an inductor motor and have a gear (not shown) installed therein.

Meanwhile, the partition 184 may include a rotating shaft 184c, with which to install the dehumidifying rotor 186 to be rotated. FIG. 6 depicts the rotating shaft 184c as being separated from the partition 184. However, when combined, the rotating shaft 184c is disposed at the center of the opening 184a.

The dehumidifying rotor 186 may have a gear (not shown), corresponding to the gear installed in the driving motor 184b, installed in the outside surface of the dehumidifying rotor 186. That is, the dehumidifying rotor 186 may rotatably be driven by the driving motor 184b.

Also, the dehumidifying rotor 186 may include a desiccant composed of an inorganic fiber, such as a ceramic fiber and a glass fiber, or a combination of an inorganic fiber and pulp. The desiccant may be powder capable of absorbing moisture from air or discharging moisture to air.

Meanwhile, the dehumidifying rotor 186 is formed to enable ventilation. When air penetrates through the dehumidifying rotor 186, the desiccant included inside the dehumidifying rotor 186 may absorb moisture from air or discharge moisture to air.

In other words, the dehumidifying rotor 186 absorbs moisture from the air drawn through the second inlet 123a and discharges moisture to the air circulated in the dehumidifying part 180 by the air circulation component 188. A detailed description will be provided below.

More particularly, the air circulation component 188 creates the flow of the air circulating in the dehumidifying part 180 in order to absorb moisture from the dehumidifying rotor 186. That is, the air circulation component 188 may be installed in the lower part of the partition 184 such that it creates a separate airflow under the flow path where the air drawn through the second inlet 123a passes through the dehumidifying rotor 186.

Meanwhile, the air circulation component 188 may include a sirocco fan, a propeller fan or a turbo fan, which is not shown in the drawings, in order to create an airflow.

The heating component 190 may be connected to the air circulation component 188 so that the heating component 190 heats the air sent by the air circulation component 188. Also, the heating component 190 heats the air drawn from the air circulation component 188 and guides the flow path of the air in order that the air may pass through the lower part of the dehumidifying rotor 186.

That is, the air heated by the heating component 190 is changed to the air having a low relative humidity due to the increase of temperature. When passing through the dehumidifying rotor 186 where moisture is contained, the air having a low relative humidity and high temperature may absorb the moisture from the dehumidifying rotor 186. In this manner, the dehumidifying rotor 186 may be heated and regenerated.

The partition 184 may include a flow hole 184d guiding an airflow to the air circulation component 188. That is, the flow hole 184d guides the flow path of the air heating and regenerating the dehumidifying rotor 186.

The condenser 192 may be installed in the partition 184 so as to be disposed on an opposing side of the partition 184 to the dehumidifying rotor 186. The condenser 192 may include an inlet hole 192a allowing the air passed through the dehumidifying rotor 186 to be drawn therethrough, an outlet hole 192b connected to the flow hole 184d, and a discharge hole 192c allowing condensed water to be discharged therethrough.

Also, the condenser 192 may include a flow tube 192d allowing the air moved by the air circulation component 188 to flow therethrough.

That is, the air, having a high temperature and humidity after being passed through the heating component 190 and the dehumidifying rotor 186, is drawn into the condenser 192 through the inlet hole 192a, flows along the flow tube 192d, and is then discharged by the outlet hole 192b. After that, the air may be redrawn into the air circulation component 188 through the flow hole 184d.

Meanwhile, the condenser 192 may include a plurality of ventilating openings 192e allowing the air drawn through the second inlet 123a to penetrate therethrough. Through the plurality of ventilating openings 192e included in the condenser 192, the air drawn through the second inlet 123a, having a relatively lower temperature than the air flowing along the flow tube 192d of the condenser 192, may flow in a direction towards the dehumidifying rotor 186.

Also, according to the airflow created by the air circulation component 188, the air passes through the air circulation component 188, the heating component 190, and the dehumidifying rotor 186, and then flows into the inlet hole 192a of the condenser 192. After that, the air passes through the flow tube 192d, the outlet hole 192b, and the flow hole 184d, and then returns to the air circulation component 188.

In order to guide the air to this airflow, the air circulation component 188, the heating component 190, the dehumidifying rotor 186, the partition 184, and the condenser 192 are connected with each other.

Meanwhile, due to heat transfer between the air flowing along the flow tube 192d and the air having a relatively low temperature drawn through the second inlet 123a and sequentially passing through the ventilating opening 192e, the temperature of the air flowing inside the condenser 192 is reduced.

In the end, the temperature of the air flowing inside the condenser 192 is reduced under the due point temperature. This causes the generation of condensed water in the flow tube 192d of the condenser 192 and the removal of moisture contained in the air flowing along the flow tube 192d.

The condensed water generated in the flow tube 192d descends due to its own weight, and is thus discharged by the discharge hole 192c formed in the lower part of the condenser 192.

Meanwhile, the condenser 192 may be formed of materials having a high thermal conduction rate for the efficient transferral of heat.

The operations of the dehumidifying part 180 are now explained again. First of all, the air drawn through the second inlet 123a by the blower fan 142 of the blower part 140 passes through the ventilating opening 192e of the condenser 192 and sequentially passes through the opening 184a of the partition 184.

After that, the air passes though the dehumidifying rotor 186, and the dehumidifying rotor 186 absorbs moisture contained in the air. Then, the air, from which the moisture is removed, is finally discharged to the outside through the discharge outlet 122a.

The dehumidifying rotor 186 may be heated and regenerated, thereby continuously absorbing moisture from the air drawn through the second inlet 123a. In order to perform this operation, the air circulation component 188 creates another airflow for the heating and regeneration of the dehumidifying rotor 186 under the flow path where the air drawn through the second inlet 123a passes through the dehumidifying rotor 186.

The air is moved to the heating component 190 by the air circulation component 188. The air is heated in the heating component 190, thereby being changed to air having a low relative humidity. This air having a high temperature and low relative humidity passes through the lower part of the dehumidifying rotor 186. At this time, the moving air absorbs moisture from the dehumidifying rotor 186, and the dehumidifying rotor 186 discharges moisture accordingly and is heated and regenerated.

After that, the air absorbing the moisture from the dehumidifying rotor 186 is drawn into the condenser 192 through the inlet hole 192*a* of the condenser 192. The air drawn into the condenser 192 moves along the flow tube 192*d*.

While this high temperature air flows along the flow tube 192*d*, the air having a relatively low temperature, which is drawn through the second inlet 123*a*, passes through the ventilating opening 192*e* of the condenser 192.

Due to the air having a relatively low temperature passing through the ventilating opening 192*e* of the condenser 192, the air having a high temperature and high relative humidity flowing along the flow tube 192*d* of the condenser 192 undergoes a drop in temperature. Accordingly, moisture contained in the air flowing inside the condenser 192 is condensed.

Also, the condensed water is discharged through the discharge hole 192*c*. The air, having a reduced relative humidity due to the moisture condensation, passes through the outlet hole 192*b* of the condenser 192 and sequentially passes through the flow hole 184*d* of the partition. Then, this air having the reduced relative humidity is redrawn into the air circulation component 188.

That is, the air is continuously circulated along the above-described flow path for the heating and regeneration of the dehumidifying rotor 186.

The condensed water storage tank 194 is installed in the lower part of the condenser 192 and connected to the outlet hole 192*c* of the condenser 192. The condensed water storage tank 194 may have an inner space in order to store water discharged from the condenser 192.

Hereinafter, the effect of an air purifier according to an exemplary embodiment of the present invention will be described in detail by the use of experimental examples.

Figure 7:
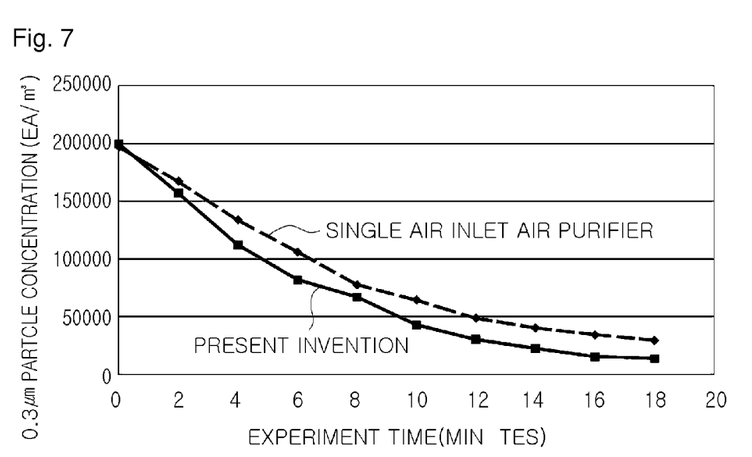
FIG. 7 is a graph illustrating the air purification effect of an air purifier according to an exemplary embodiment of the present invention.
Figure 8:
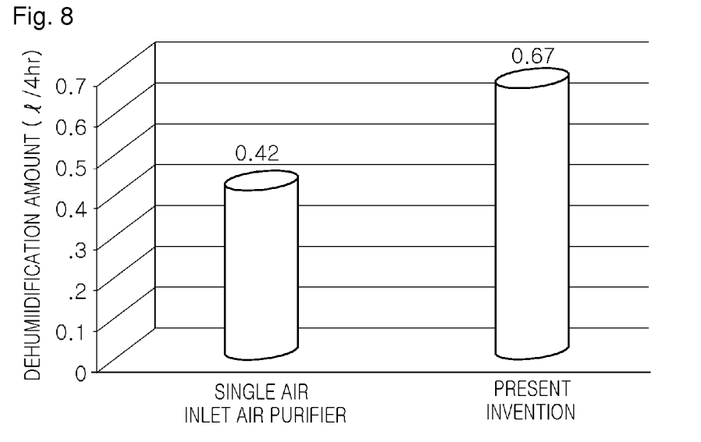
FIG. 8 is a graph illustrating the dehumidification effect of an air purifier according to an exemplary embodiment of the present invention.

FIG. 7 is a graph illustrating the air purification effect of an air purifier according to an exemplary embodiment of the present invention. FIG. 8 is a graph illustrating the dehumidification effect of an air purifier according to an exemplary embodiment of the present invention.

Referring to FIG. 7, this experiment was designed to compare the air purification effect between a single air intake air purifier (comparative example), in which the air drawn through a single inlet passes through a dehumidifying part and sequentially passes through an air purifying part and then is discharged to the outside, and an air purifier (inventive example) according to an exemplary embodiment of the present invention.

In this experiment, both of the air purifiers according to the comparative example and the inventive example employed the same blower fan and the same driving source allowing the blower fan to be driven. Also, both of them employed the same air purifying filter and the same dehumidifying part.

Moreover, the rotation of the blower fan was set at 960 RPM.

As shown in FIG. 7, it has been understood that the particle concentration remaining after the operation of the air purifier according to the inventive example was lower than that remaining after the operation of the air purifier according to the comparative example.

That is, it has been understood that the air purification effect of the air purifier according to the inventive example is higher than that of the air purifier according to the comparative example, which was obtained by performing the dehumidification and purification of the air having a single airflow.

Referring to FIG. 8, this experiment was designed to compare the dehumidification effect between a single air intake air purifier (comparative example), in which the air drawn through a single inlet passes through a dehumidifying part and sequentially passes through an air purifying part and then is discharged to the outside, and an air purifier (inventive example) according to an exemplary embodiment of the present invention.

In this experiment, both of the air purifiers according to the comparative example and the inventive example employed the same blower fan and the same driving source allowing the blower fan to be driven. Also, both of them employed the same air purifying filter and the same dehumidifying part.

Moreover, the rotation of the blower fan was set at 960 RPM.

As shown in FIG. 8, it has been understood that the amount of condensed water dehumidified after the operation of the air purifier according to the comparative example is smaller than that dehumidified after the operation of the air purifier according to the inventive example.

That is, it has been understood that the dehumidification effect of the air purifier according to the inventive example is higher than that of the air purifier according to the comparative example, which was obtained by performing the dehumidification and purification of the air having a single airflow.

As set forth above, according to exemplary embodiments of the invention, the air purifier is able to purify the air drawn through one side of the body case 120, i.e., the first inlet 121*a*, and dehumidify the air drawn through the other side of the body case 120, i.e., the second inlet 123*a*, by the use of the single blower fan 142, thereby alleviating a drop in the airflow amount caused by performing the dehumidification and the purification at the same time.

Accordingly, the dehumidification and purification performances can be improved.

Also, the air inflow into any one of both sides of the body case 120 may be blocked by the first and second opening and closing members 130 and 134 and the first and second rotating members 121*b* and 123*b*, so the dehumidification function removing moisture from the inflow air and/or the purification function purifying the inflow air may be selectively performed according to a user s preference.

When the heat, generated by the driving source 144 which allows the blower fan 142 to be driven, is detected to be greater than the preset value by the heat detecting member 146, the first opening and closing member 129 allows the amount of the dehumidified air drawn into the blower part 140 to be reduced, thereby preventing the blower fan 142 drawing the outside air into the inner space of the body case 120 from being stopped.

Moreover, the constant pressure required to draw the outside air through both sides of the body case 120 may be properly distributed by the first and second through-holes 129*a* and 133*a* of the different size, thereby alleviating a drop in the airflow amount caused by concurrently performing the dehumidification and the purification.

Meanwhile, the dehumidifying part 180 performs the dehumidification through the dehumidifying rotor unit 182, without the use of a thermodynamic cooling cycle device, thereby reducing an installation space of the dehumidifying part 180 and reducing noise and vibration that may be caused when the thermodynamic cooling cycle device is installed.

While the present invention has been shown and described in connection with the exemplary embodiments, it will be apparent to those skilled in the art that modifications and variations can be made without departing from the scope of the invention as defined by the appended claims.

The invention claimed is:

1. An air purifier comprising:
   a body case having an inner space;
   a blower part installed in the inner space of the body case and drawing outside air from both sides of the body case through a single blower fan;
   an air purifying part purifying air drawn from one side of the body case; and
   a dehumidifying part removing moisture from air drawn from the other side of the body case by a dehumidifying rotor,
   wherein the body case comprises a first partition unit for separating the dehumidifying part from the blower part, the first partition unit including a first through-hole in order to draw the air drawn from the other side of the body case into the blower part; and
   wherein the first partition unit comprises a first opening and closing member opening and closing the first through-hole in order to a adjust a flow amount of the air drawn into the blower part through the first through-hole.

2. The air purifier of claim 1, wherein the blower part comprises a heat detecting member detecting heat generated from a driving source, the driving source being connected to the blower fan and allowing the blower fan to be driven,
   when the heat detected by the heat detecting member is greater than a preset value, the first through-hole is blocked by the first opening and closing member or the humidifying part ceases operations.

3. The air purifier of claim 2, wherein the blower fan has an opening on one surface thereof and at least one entry hole on the other surface thereof in order to draw the air in both directions.

4. The air purifier of claim 1, wherein the body case further comprises a second partition unit separating the air purifying part from the blower part and including a second through-hole in order to draw the air drawn from one side of the body case into the blower part.

5. The air purifier of claim 4, wherein the second partition unit comprises a second opening and closing member opening and closing the second through-hole in order to adjust a flow amount of the air drawn into the blower part through the second through-hole.

6. The air purifier of claim 5, wherein the first through-hole is smaller than the second through-hole in order that constant pressure required when air is drawn from one side of the body case is equal to or similar to that required when air is drawn from the other side of the body case.

7. The air purifier of claim 5, wherein the body case further comprises a first inlet allowing air to be drawn through one side of the body case and a second inlet allowing air to be drawn through the other side of the body case opposite to the first inlet.

8. The air purifier of claim 7, further comprising a controlling part connected to the first and second opening and closing members, first and second rotating members, and a heat detecting member, and adjusting to an amount of the air drawn into the blower part.

9. The air purifier of claim 8, wherein the body case further comprises the first and second rotating members respectively installed in the first and second inlets and allowing the outside air to be drawn through the first and second inlets or to be blocked.

10. The air purifier of claim 1, wherein the dehumidifying part comprises: a dehumidifying rotor unit having the dehumidifying rotor installed to be rotated and removing the moisture from the air drawn from the other side of the body case; a condenser connected to the dehumidifying rotor unit and condensing the moisture removed from the dehumidifying rotor unit; and a condensed water storage tank connected to the condenser and storing condensed water.

11. The air purifier of claim 10, wherein the dehumidifying rotor unit comprises:
    a partition installed in the body case and dividing a space in which the dehumidifying part is disposed;
    the dehumidifying rotor installed in the partition to be rotated and removing the moisture from the air drawn from the other side of the body case;
    an air circulation component creating a separate airflow circulating within the dehumidifying part in order to remove the moisture from the dehumidifying rotor absorbing the moisture from the air drawn from the other side of the body case; and
    a heating component disposed between the dehumidifying rotor and the air circulation component in order to heat the air sent by the air circulation component.

12. The air purifier of claim 11, wherein the condenser comprises:
    an inlet hole allowing the air circulated by the air circulation component to be drawn therethrough;
    an outlet hole allowing the air drawn from the inlet hole in a dehumidified state to be outputted therethrough; and
    a flow tube allowing the air circulated by the air circulation component to flow therethrough in order to perform heat transfer with air penetrating through a ventilating opening, the ventilating opening being formed to allow the air drawn from the other side of the body case to penetrate therethrough.

13. The air purifier of claim 12, wherein the condenser further comprises a discharge hole allowing condensed water condensed from the air circulated by the air circulation component to be discharged therethrough.

* * * * *